Oct. 1, 1957  E. BOSSHARD  2,808,215
SEALING SHIELDS FOR ROLLER MILLS
Filed March 2, 1956  2 Sheets-Sheet 1

INVENTOR
Ernst Bosshard
BY C. P. Goepel
his ATTORNEY

Oct. 1, 1957  E. BOSSHARD  2,808,215
SEALING SHIELDS FOR ROLLER MILLS
Filed March 2, 1956  2 Sheets-Sheet 2
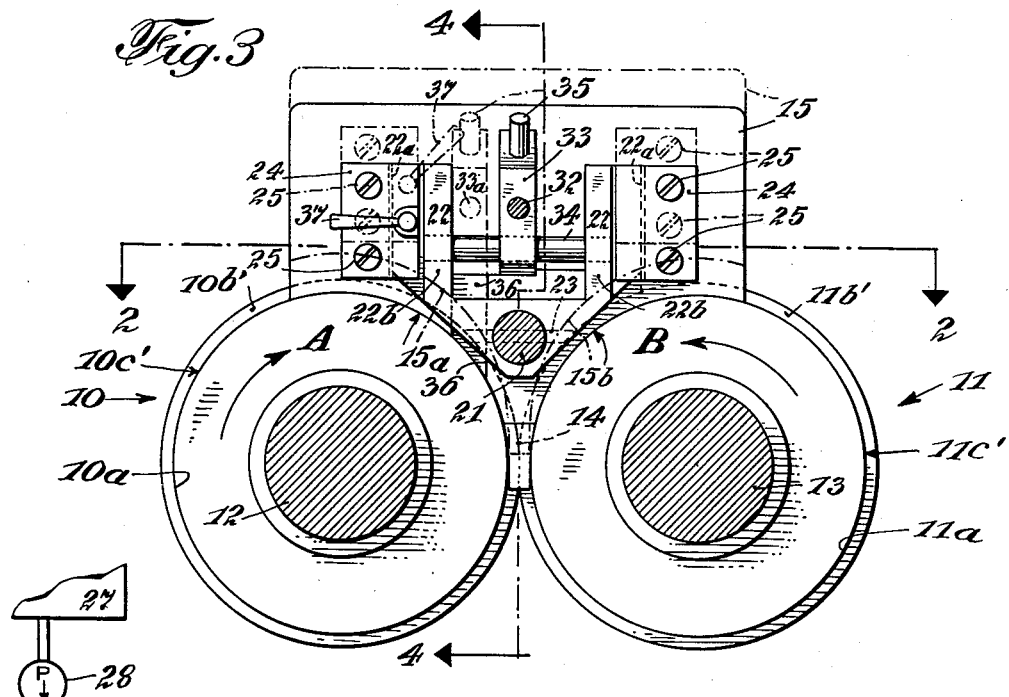
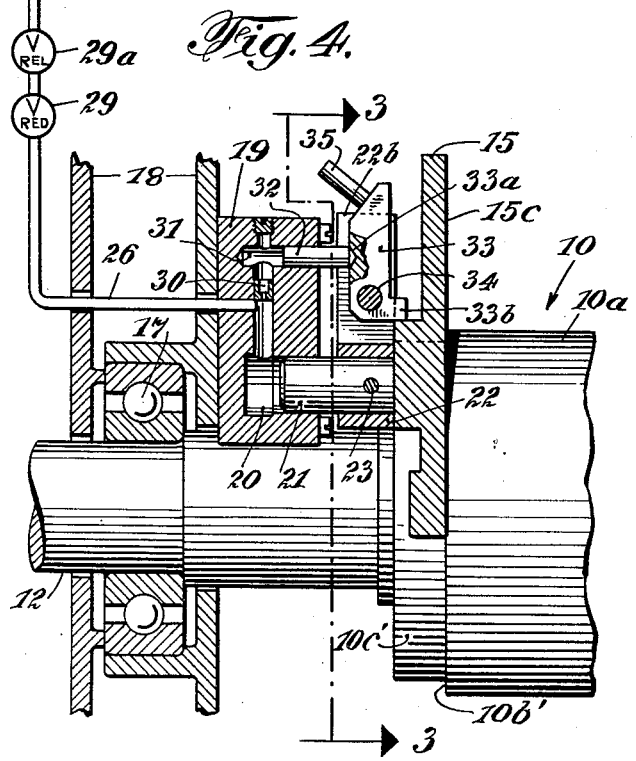
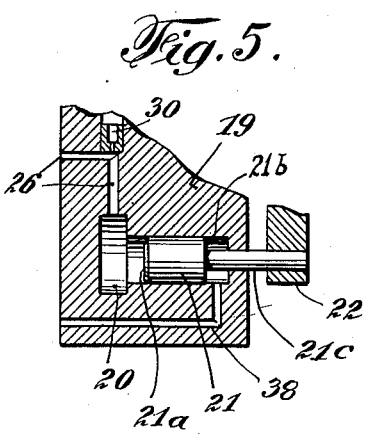
INVENTOR
Ernst Bosshard
BY C. P. Goepel
his ATTORNEY

United States Patent Office 2,808,215
Patented Oct. 1, 1957

2,808,215

SEALING SHIELDS FOR ROLLER MILLS

Ernst Bosshard, Uzwil, Switzerland, assignor to Gebrüder Bühler, Uzwil, Switzerland, a corporation of Switzerland Application March 2, 1956, Serial No. 569,027

Claims priority, application Switzerland March 3, 1955

14 Claims. (Cl. 241—226)

This invention relates to sealing shields for roller mills, and more particularly to an apparatus for applying the sealing shields to rollers at a constant and reproducible pressure.

In roller mills for fine grinding of liquid and pasty materials, such as are used, for example, in chocolate or paint industry, the material is supplied from feed troughs into the gap between a pair of rollers, and sealing shields are disposed at both axial ends thereof to prevent escape of the liquid or pasty substance. Such sealing shields are preferably oscillatable in the direction parallel with the axes of rollers and are pressed against the end surfaces thereof by means of threaded spindles. In order to achieve a superior sealing, the shields are also subjected to radial pressure to bear against portions of the periphery of the rollers, preferably against a pair of peripheral surfaces of reduced diameter at both axial ends of the rollers. The material that would otherwise escape is retained by oblique, wedge-shaped flaps of the sealing shields and redirected into the gap between the rollers.

There are certain disadvantages in the known constructions of this character that are mainly due to the lack of proper control over the pressure between the rollers and sealing shields. Excessive axial or radial pressure generates considerable frictional heat and wear of the shields. The machine runs irregularly and requires too much power. Also, the wear of the sealing shields necessitates repeated adjustment and frequent replacement thereof.

The present invention represents a significant improvement over the known systems of the above described character in that it provides an apparatus for applying the sealing shields to the rollers of a roller mill for fine grinding of liquid or pasty substances at a controlled, constant and reproducible pressure resulting in reduction in wear of the shields and less heat generation.

Basically, the invention resides in the provision of a system employing a hydraulic fluid under controlled pressure to urge the sealing shields first axially against portions of the end surfaces and immediately thereafter in radial direction against portions of peripheral surfaces of the rollers. Suitable valves are provided in the conduits to control the pressure of the hydraulic fluid and to reproduce the pressure after temporary removal of sealing shields for cleaning or for any other reason. The wear on the contact surfaces of the rollers and shields is considerably reduced and a smooth run of the roller mill is insured.

Other features and advantages of the novel apparatus will become apparent and will be pointed out in more detail in the course of the following description of some at this time preferred embodiments which are illustrated in the accompanying drawing, and the invention will be finally pointed out in the appended claims.

In the drawing, wherein similar characters of reference indicate similar elements, Fig. 1 is a top plan view of a pair of rollers, two sealing shields and the apparatus for controlling the pressure of the latter;

Fig. 3 is an enlarged vertical section taken on line 3—3 in Fig. 1;

Fig. 4 is a section taken on line 4—4 in Fig. 3; and

Fig. 5 is an enlarged detail view of a portion of the apparatus of Fig. 4, showing a modification thereof.

Figure 1:
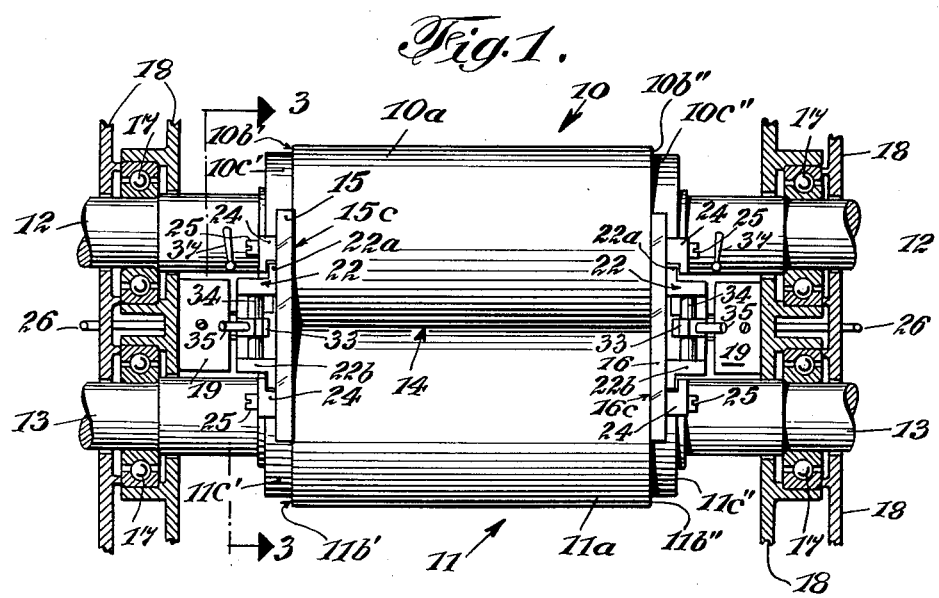
Figure 2:
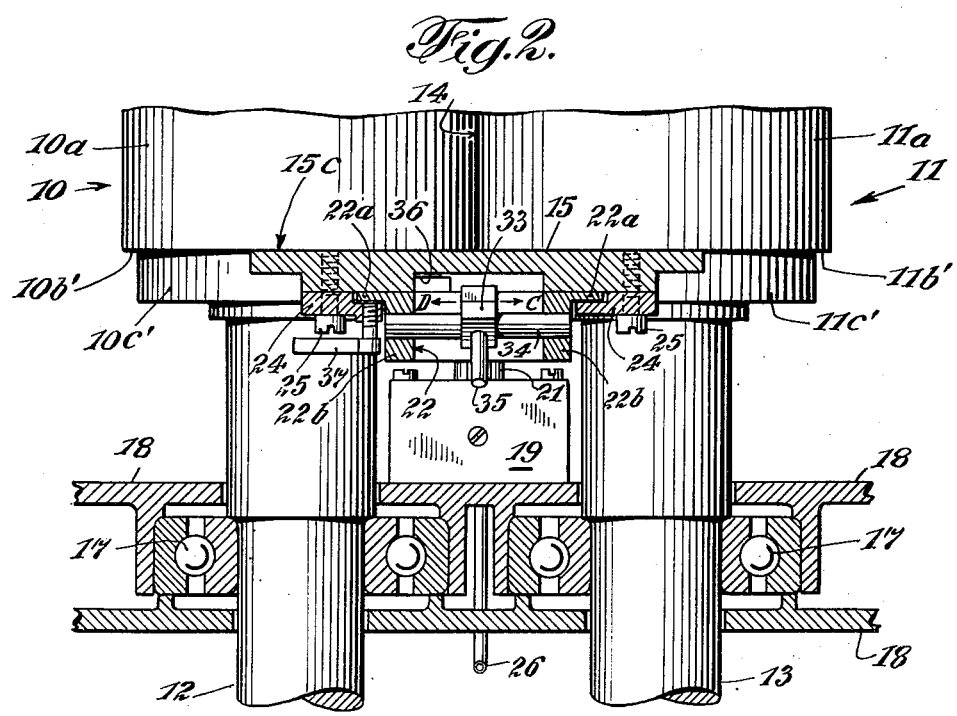
Fig. 2 is an enlarged view of the left-hand end of the apparatus shown in Fig. 1, with portions of the shield and its supporting members broken away, as seen from line 2—2 in Fig. 3.

Referring now in detail to the illustrated embodiments, and first to that shown in Figs. 1 to 4, a pair of rollers 10, 11 mounted, respectively, on shafts 12, 13 and rotatable in the direction of arrows A, B (see Fig. 3), define an elongated gap 14 which is limited by the peripheral surfaces 10a, 11a of the rollers and a pair of sealing shields 15, 16. Shield 15 is of a suitable contour to bear with its front surface 15c (see Fig. 4) against the end surfaces 10b', 11b' of the rollers 10, 11, and also against the peripheries of the respective reduced portions 10c', 11c' of said rollers with its concave surfaces 15a, 15b (see Fig. 3). Similarly, shield 16 bears against end surfaces 10b'', 11b'' and peripheries of reduced portions 10c'', 11c'' of rollers 10, 11 with its flat surface 16c and its concave surfaces 16a, 16b, respectively.

The liquid or pasty material fed into the gap 14 from a feed trough supported above the rollers 10, 11 (not shown), is prevented from escaping in axial direction by the shields 15, 16 that extend above the rollers, as shown in Figs. 3 and 4.

Roller shafts 12, 13 rotate in suitable bearings 17 supported by the frame 18 of the roller mill.

The apparatus that controls the pressure between the rollers 10, 11 and shields 15, 16 is best shown in Fig. 4. Since the systems at both axial ends of the rollers are identical, only one will be described. A block 19 which is secured to the frame 18 houses a cylinder 20 that receives one end of piston 21. A pin 23 secures the other end of piston 21 to support 22 which bears against the sealing shield 15, the latter having attached thereto a pair of angles 24 by means of screws 25. Angles 24 engage lateral extensions 22a of the support 22 and permit movement of the shield 15 in a direction perpendicular to the axes of roller shafts 12, 13. As seen in Figs. 3 and 4, when the hydraulic fluid in cylinder 20 moves piston 21 toward right, the sealing shield 15 is pressed against the end surfaces 10b', 11b' of rollers 10, 11. A conduit 26 connects the cylinder 20 with a source of fluid 27, a pump 28, a reversing valve 29a and a pressure reducing valve 29.

When the sealing shield 15 is brought into contact with surfaces 10b', 11b' of rollers 10, 11, fluid flows through nozzle 30 in block 19 to build up the pressure in a second cylinder 31 that receives one end of a piston 32, the other end of said piston engaging an angular lever 33 that is journaled on the shaft 34 between two vertical extensions 22b of the support 22. The lever 33 is axially movable along shaft 34, as indicated by arrows C, D in Fig. 2. When in operative position, the angular lever 33 is held against displacement along shaft 34 by the end of piston 32 that enters a recess 33a therein. Piston 32 urges lever 33 to pivot around shaft 34, whereby its lower end 33b engages the shield 15 and causes its surfaces 15a, 15b to bear against the peripheries or reduced portions 10c', 11c' of the respective rollers.

For cleaning of the trough or of the rollers, the sealing shields are usually taken out of their supports or suspended in a position permitting the cleaning of the apparatus. The novel system permits the removal of the shields, or said shields may be moved into a position indicated in dot-dash lines in Fig. 3. In both cases, the pressure of fluid in cylinders 20 and 31 is reduced to zero by actuating the reversing valve 29a, and the angular member 33 is then pivoted against piston 32 by the handle 35 to express the fluid from cylinder 31 through the nozzle 30. The angular member 33 is then shifted axially along shaft 34 until it reaches the vertical slot 36 in sealing shield 15, as shown in dot-dash lines in Fig. 3, whereupon said shield may be lifted into its position shown in dot-dash lines in Fig. 3 together with angles 24 that slide along extensions 22a of the support 22. If complete removal of the shield 15 is not desired, it may be locked in raised position above the rollers by a stop screw 37 which traverses one of the angles 24 and may engage the extension 22a of the support 22 (see Fig. 2).

To bring the shield 15 back into operative position, the stop screw 37 is released, whereupon the shield may be slid downwardly into contact with peripheries of the reduced portions 10c', 11c'. The lever 33 is shifted axially along shaft 34 from the slot 36 in the shield 15 and into alignment with the end of piston 32. The reversing valve 29a is actuated to build up pressure in cylinders 20 and 31, the pressure being controlled by the reducing valve 29. Thus, the pressure after cleaning may be identical with the optimum pressure before removal or lifting of the shield.

The modification of Fig. 5 shows an arrangement permitting movement of the sealing shields toward and away from the rollers by the pressure of hydraulic fluid. In the pressing phase, the fluid flows through the conduit 26 into the cylinder 20 to press against the end 21a of piston 21 whose shaft 21c is connected to the support 22, as previously described. In the disengaging phase, the flow of hydraulic fluid is directed into line 38 by a conventional reversing valve (not shown), whereupon the fluid pressure against surface 21b causes the piston 21 to move toward left and to disengage the shield 15 from the rollers.

Various changes and modifications will occur to persons skilled in the art within the spirit of this invention, and I therefore do not desire to be limited to the exact details shown and described, but only by the scope of the appended claims.

I claim:

1. In a roller mill having a pair of parallel rollers, each of said rollers having a peripheral surface and a pair of end surfaces at the respective axial ends thereof, a frame for rotatably supporting said rollers, and a pair of sealing shields; an apparatus for applying hydraulic pressure to said shields including a source of hydraulic fluid, a first pair of cylinders and pistons, a second pair of cylinders and pistons, conduit means between said source of hydraulic fluid and said cylinders, a source of pressure in said conduit means, first operative connections between said first pistons and said shields for urging said shields against selected portions of said end surfaces of and in the directions parallel with the axes of said rollers, and second operative connections between said second pistons and said shields for urging said shields against selected portions of said peripheral surfaces of said rollers and in the direction substantially perpendicular to the axes thereof in the proximity of the axial ends of said rollers.

2. The apparatus according to claim 1, wherein a pressure reducing valve is provided in said conduit means.

3. The apparatus according to claim 1, wherein a pressure reversing valve is provided in said conduit means.

4. The apparatus of claim 1, wherein said first pistons are double acting pistons.

5. The apparatus according to claim 1, wherein said first pistons are disposed in said first cylinders for movement parallel with the axes of said rollers and each of said first operative connections includes a support member between one end of one of said first pistons and one of said shields, said support member being attached to said first piston and having a releasable connection with said shield.

6. The apparatus of claim 5, wherein said support member includes a pair of vertical flanges for vertically oscillatably supporting said shield.

7. The apparatus of claim 6, wherein a device is provided between at least one of said flanges and said shield for locking said shield against vertically oscillating movement with respect to said support member.

8. The apparatus of claim 5, wherein each of said second operative connections includes a horizontal shaft supported by one of said support members, a lever pivotally and axially movably supported by said shaft, said lever having a pair of arms, the first of said arms engaging and urging one of said shields in a direction substantially perpendicular to the axes of said rollers when the second of said arms is engaged by one of said second pistons.

9. The apparatus of claim 8, wherein each of said shields is provided with a vertical slot for reception of said second arm of said lever when said lever is moved along said shaft and away from said second piston, whereby said shield is adapted to be lifted above and away from said rollers.

10. In a roller mill having a frame, a pair of parallel rollers horizontally and rotatably supported by said frame, each of said rollers having a peripheral surface and a pair of end surfaces at the axial ends thereof, and a pair of sealing shields adapted to sealingly engage selected portions of said peripheral and said end surfaces at the respective axial ends of said rollers; an apparatus for applying pressure to said shields including a source of hydraulic fluid, a pair of first cylinders attached to said frame in the proximity of the axial ends of said rollers, conduit means for connecting said source of hydraulic fluid with said first cylinders, a source of pressure, a pressure control and a pressure reducing valve in said conduit means, a first piston for each of said cylinders having one end thereof operatively and releasably connected to a respective one of said shields for applying hydraulic pressure thereto in a direction parallel with the axes of said rollers whereby said shields sealingly engage selected portions of said end surfaces of said rollers, a pair of second cylinders in communication with said first cylinders, a second piston for each of said second cylinders, and means for operatively connecting said second pistons with a respective one of said shields for applying hydraulic pressure thereto in a direction substantially perpendicular to the axes of said rollers whereby to provide a seal between said shields and selected portions of said peripheral surfaces of said rollers in the proximity of the axial ends thereof.

11. The apparatus of claim 10, wherein said means for operatively connecting said second pistons with said shields each include a support member attached to a respective one of said first pistons, a shaft in said support member, an angular lever pivotally attached to said shaft and slidable therealong, said lever having a pair of arms, the first of said arms bearing against one of said shields when the second of said arms is engaged by said second piston.

12. The apparatus of claim 11, wherein each of said shields is provided with a slot substantially perpendicular to the axes of said rollers for reception of said first arm of a respective one of said levers when said lever is slid along said shaft in said support member away from engagement with said second piston, whereby said shield may be moved in a direction above and away from said rollers.

13. The apparatus of claim 12, wherein locking means is provided for maintaining each of said shields in a position above and away from said rollers, said locking means including a threaded member supported by said shield and adapted to engage said support member.

14. The apparatus of claim 11, wherein each of said support members includes a body portion having one surface thereof parallel with said end surfaces at one axial end of said rollers with one of said sealing shields therebetween, one of said first pistons being connected thereto for moving said support member against and urging said shield into sealing engagement with selected portions of said end surfaces of said rollers at one axial end thereof, a horizontal shaft in said supporting member, a lever with a pair of arms pivotally and axially oscillatably supported by said shaft, the first of said arms engaging and urging said shield in a direction perpendicular to the axes of said rollers for engaging selected portions of said peripheral surfaces at one axial end of said rollers when the second of said arms is engaged by one of said second pistons, each of said shields having a vertical slot for reception of said first arm when the second arm is moved along said shaft and away from said second piston, whereby said shield may be moved above and away from said rollers when said pressure reducing means in said conduit is actuated.

References Cited in the file of this patent

UNITED STATES PATENTS

| | | |
|---|---|---|
| 1,848,916 | Vasel | Mar. 8, 1932 |
| 2,060,868 | Hollstein | Nov. 17, 1936 |
| 2,545,921 | Goodwillie et al. | Mar. 20, 1951 |

FOREIGN PATENTS

| | | |
|---|---|---|
| 684,302 | Great Britain | Dec. 17, 1952 |
| 715,509 | Great Britain | Sept. 15, 1954 |